Nov. 18, 1969     C. C. RIPLEY     3,479,250

IN-REACTOR CONTROL DRIVE SYSTEM

Filed Dec. 29, 1967     2 Sheets-Sheet 1

INVENTOR.
CHARLES C. RIPLEY

BY Roland A. Anderson

ATTORNEY

Nov. 18, 1969   C. C. RIPLEY   3,479,250
IN-REACTOR CONTROL DRIVE SYSTEM
Filed Dec. 29, 1967   2 Sheets-Sheet 2

INVENTOR.
CHARLES C. RIPLEY
BY Roland A. Anderson
ATTORNEY

United States Patent Office 3,479,250
Patented Nov. 18, 1969

3,479,250
IN-REACTOR CONTROL DRIVE SYSTEM
Charles C. Ripley, San Jose, Calif., assignor to the United States of America as represented by the United States Atomic Energy Commission
Filed Dec. 29, 1967, Ser. No. 694,728
Int. Cl. G21c 7/16
U.S. Cl. 176—36                                                                 6 Claims

ABSTRACT OF THE DISCLOSURE

Nuclear reactor control drive system in which a fluidic amplifier for switching a force-transmitting fluid is located at the base of a piston-driven control rod assembly in a nuclear reactor having two tubes, one communicating with the bottom of the control rod and piston, and the other communicating with the top of the control rod and piston. A fluid signal into the amplifier diverts the flow of a force-transmitting fluid from one tube to the other to either raise or lower the control rod by hydraulic pressure of the flowing force-transmitting fluid against the piston.

BACKGROUND OF THE INVENTION

The invention described herein was made in the course of, or under, AEC Contract No. AT(04-3)-189, Project Agreement No. 47, with the United States Atomic Energy Commission.

This invention relates generally to systems for moving nuclear reactor components including control rod elements, reflectors or shields, and in particular, to control rod driving and scramming devices utilized to position control rods of a nuclear reactor in operating or shutdown condition.

In order to simplify the design and reduce the cost of a nuclear reactor, it is desirable to have as few moving mechanical parts as possible, and also to have as few penetrations of the reactor pressure vessel as possible. The latter is especially true with regard to penetrations involving relative movement of the parts, seal integrity, etc.

The nuclear reactor control rod systems of the prior art generally require one moving penetration of the reactor pressure vessel for each control rod installed in the reactor. Each of these penetrations requires seals and precision machining to assure a pressure-tight assembly before, during, and after operation of the reactor. The control rod drive mechanisms for these systems are required to be located outside the pressure vessel due to their suitability to operate at high temperatures in a high neutron flux and gamma radiation environment. Even hydraulically actuated control rod systems of the prior art utilize valves or other mechanical devices involving moving parts which, in order to assure satisfactory operation, are required to be located outside the reactor pressure vessel.

Furthermore, such equipment including valves, pumps or drive equipment, typical of all moving part mechanical devices, is subject to wear, breakdown and periodic maintenance necessitating expensive and time-consuming shutdowns of the reactor.

SUMMARY OF THE INVENTION

The apparatus of the present invention comprises a hydraulically actuated control rod drive system which uses a fluidic amplifier switch employing momentum exchange of a control jet and the Coanda effect to control, hydraulically, the direction of fluid flow to drive a control rod into or out of the core of a nuclear reactor with no moving mechanical parts other than the control rod and piston.

Basically, the apparatus comprises a hydraulic cylinder including a free floating piston control rod drive disposed in a cylindrical tube, together with means for directing a force-transmitting hydraulic fluid to either end of the tube as controlled by a hydraulic flow direction switching device. The force-transmitting fluid flows continuously, and is deflected from one end of the cylinder to the other by a small flow of control fluid applied to said switching device to cause the control rod drive piston to travel either up or down the cylinder in response to the flow of the control fluid and the consequent redirection of the force-transmitting fluid. In this manner, no mechanical valves or other moving part position control mechanisms are used. The control of the main force-transmitting fluid is achieved through the use of a small stream of control fluid directed at the force-transmitting fluid to deflect it against one or the other of the two walls of the switching chamber to utilize the Coanda effect, i.e., the tendency of a fluid stream to adhere to a chamber wall along which the fluid is flowing.

It is therefore an object of this invention to provide a control rod drive system having a minimum number of moving parts.

It is a further object of this invention to provide a control rod drive system actuated solely by hydraulic forces.

It is another object of this invention to provide a control rod drive system in which a hydraulic amplifier switch controls the positioning of a control rod in a nuclear reactor core.

It is still another object of this invention to provide a control rod drive system in which the reactor coolant is used in conjunction with a fluidic amplifier switch to control the positioning of a control rod in a nuclear reactor core.

Other and more particular objects of this invention will be manifest upon study of the following detailed description when taken together with the accompanying drawings.

DESCRIPTION OF THE PREFERRED EMBODIMENT

In the present invention, the stream of fluid used to drive the piston and coupled control rod up and down, i.e., into and out of the core of the reactor, will be referred to as the force-transmitting or hydraulic fluid, while the stream of fluid whose flow is used to divert the force-transmitting fluid will be referred to as the control fluid. Generally, these fluids may be either a gas or a liquid flowing at such velocity and volume rate as to be effective to perform the required control and force-transmitting functions. In the present invention, it is preferred that the fluid be the coolant used in the reactor, for example, in most currently developed reactors, either water or liquid sodium. When the force-transmitting and control fluids are the same as the coolant, it may be conveniently exhausted into the reactor coolant system in the core and not require a special exhaust system which would increase the construction cost and complexity of the reactor.

The devices are conceived such that a failure of the flow or either the control fluid or the force-transmitting fluid (or the reactor coolant if it be the source of the force-transmitting fluid) will bring about a gravity scram of the control rod.

Figure 1:
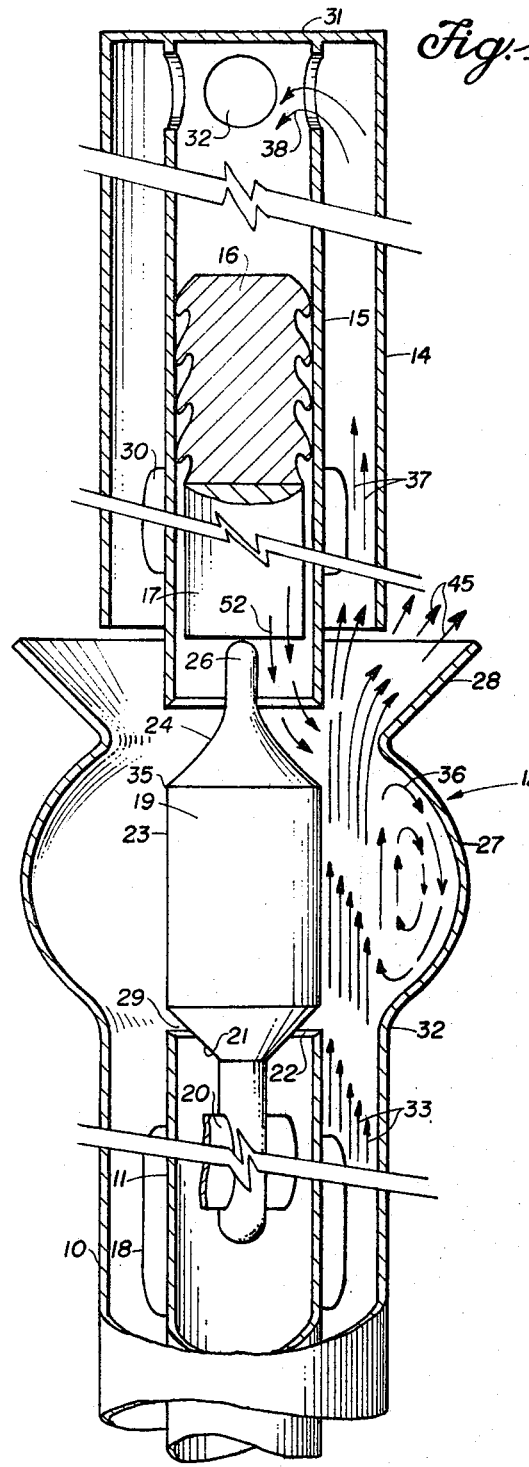
FIGURE 1 is a longitudinal section through the apparatus showing the flow of force-transmitting fluid when no control fluid is flowing.
Figure 2:
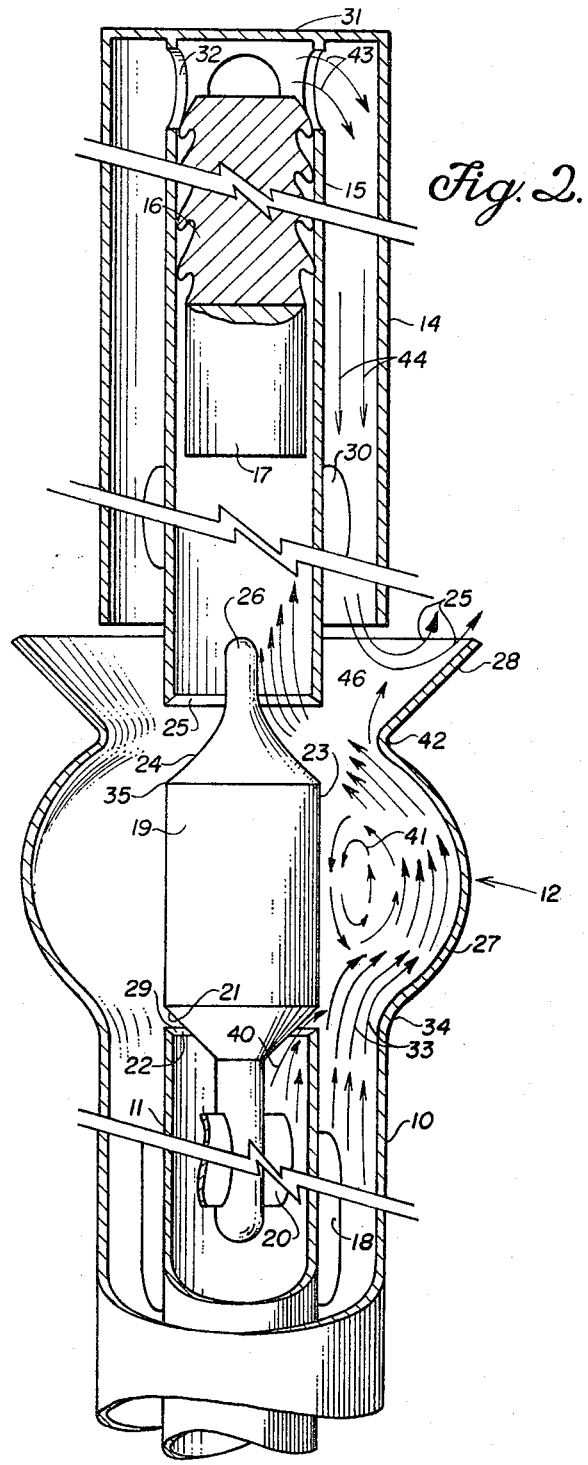
FIGURE 2 is a longitudinal section through the apparatus showing the flow of force-transmitting fluid when the control fluid is flowing in the system.

With reference to FIGURES 1 and 2, the system basically comprise a force-transmitting fluid conduit 10 concentric about a control fluid conduit 11 with a fluidic flow switch unit 12, i.e., a fluidic or hydraulic amplifier deflector, extending upwardly from the ends of conduits 10 and 11 toward concentric outer and inner cylindrical tubes 14 and 15, coaxially arranged with respect to conduits 10 and 11, respectively, therewith. The output of switch unit 12 is directed into either the bottom end of outer cylindrical tube 14, to be communicated to the upper end of inner cylindrical tube 15 concentric therein, to drive piston 16 downward or into the bottom end of cylinder 15 to drive piston 16 upward, depending on whether control fluid is flowing or not. Piston 16, at the lower end (although the piston may be the other end of the control rod), is connected to neutron-absorbing control rod 17, and both are slidable within cylinder 15 so that control rod 17 is likewise driven upward or downward, depending upon whether control fluid is or is not flowing.

When no control fluid is flowing in control conduit 11 (FIGURE 1), the force-transmitting fluid is directed by hydraulic (fluidic) switch unit 12 to enter the bottom opening between outer cylindrical tube 14 and inner cylindrical tube 15.

When control fluid is caused to flow in control conduit 11 (FIGURE 2), the flow of force-transmitting fluid is diverted, i.e., switched, to enter into the bottom end of inner cylindrical tube 15 with such force as to drive piston 16 and connected control rod 17 upward in inner cylindrical tube 15. To maintain piston 16 and rod 17 in the "up" position, the flow of control fluid must be continuous.

The force-transmitting fluid pressure can be supplied in the present embodiment by use of an electromagnetic pump to boost the coolant (liquid sodium) pressure. This same method may be used to boost the pressure of the control fluid. Other types of pumps common in the art may also be used when other fluids such as steam or water are used instead of liquid sodium. The flow control and pressure-generating devices are common in the art, and are not illustrated herein since they form no element of the present invention.

Figure 4:
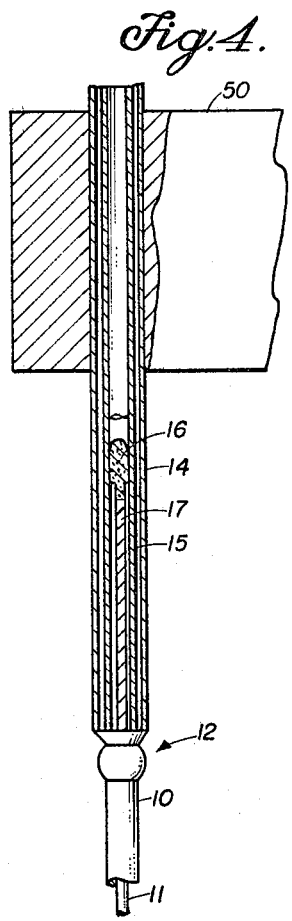
FIGURE 4 is a partial longitudinal section through the core of a typical nuclear reactor showing the position of fuel or moderator type control rod with control fluid off and force-transmitting fluid on and/or gravity holding rod in reactor "off" condition.
Figure 3:
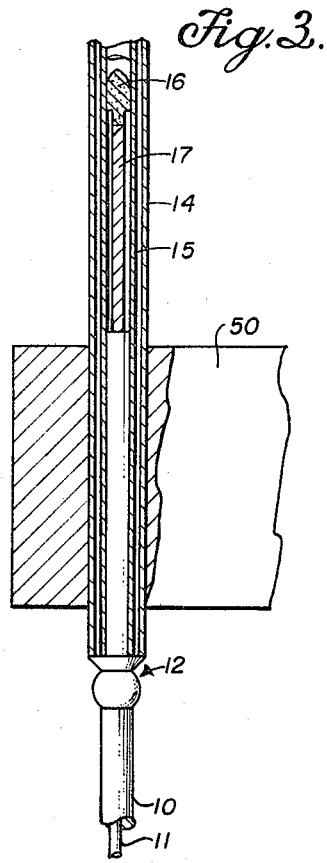
FIGURE 3 is a partial longitudinal section through the core of a typical nuclear reactor showing the position of poison type control rod with control and force-transmitting fluids flowing such that reactor is "on"

In general, referring to FIGURES 3 and 4, the entire assembly illustrated in FIGURES 1 and 2 may be located inside a pressure vessel (not shown) containing a nuclear reactor core 50. The assembly can be located in a lower or upper plenum in said vessel, with either the upper or lower concentric conduit or tube members projecting into a channel in core 50 in either of the two ways as illustrated respectively in FIGURES 3 and 4. For the purpose of simplifying the drawing, only one assembly is illustrated, that is, in FIGURES 1 and 2. It must be noted that, in practicing the present invention, a plurality of such assemblies may be used in ordered array throughout core 50, the exact number depending upon the neutron control requirements of the core, determined by conventional practice.

FIGURE 3 illustrates a failsafe installation in which control rod 17 contains a neutron absorber or poison, and is held outside reactor core 50 at the upper end of cylindrical tube 15 when the force-transmitting fluid is directed into the bottom end of cylinder 15, i.e., when control fluid is flowing in control fluid conduit 11. Any failure of flow in either the force-transmitting fluid or control fluid will cause control rod 17 to fall under the force of gravity down into core 50 and shut down the reactor. It will be apparent that such an installation is appropriate to provide a failsafe scram safeguard in the event of a reactivity excursion, or otherwise to shut down the reactor with great speed and certainty.

FIGURE 4 illustrates a second configuration in which a lack of flow of either force-transmitting fluid or control fluid will cause control rod 17 to remain outside of core 50 and thus not provide a failsafe shutdown or scram reactivity control condition in the reactor in the event that the control rod includes a neutron poison or absorber.

For a failsafe condition to be obtained with the configuration in FIGURE 4, fissile fuel rods, or other reactivity enhancing material rods, may be used instead of control rod 17 connected to piston 16. In this situation, reactivity will be removed from the reactor in the event of a failure of either force-transmitting fluid or control fluid to rapidly shut down the reactor. It will be appreciated that, with either of the foregoing installations, fine control of the operating level of the reactor will ordinarily be achieved with another reactivity control such as reflector control, Doppler shift, or other conventional means (not shown).

Moreover, it may be noted that the flow of force-transmitting fluid required for operation of the devices may be supplied by the pressure differential existing across said reactor core as created by the customary pumping of coolant into said lower vessel plenum through conduits 10, thence through coolant channels and upper plenum of said vessel. The direct and short fluid paths and minimal number of moving elements provide a system of very low inertia and commensurate rapidity of response which is desirable, or is even critical, in scram and other emergency shutdown situations.

In detail, the specific embodiment illustrated in FIGURES 1 and 2 comprises the aforementioned force-transmitting fluid conduit 10 concentric about control fluid conduit 11, with spacer fins 18 maintaining the spaced apart relation between conduits 10 and 11. Hydraulic amplifier or fluidic switch unit 12 disposed at the ends of conduits 10 and 11 comprises a generally cylindrical spindle form central guide body 19, coaxial with the common longitudinal axis of conduits 10 and 11, maintained in fixed spaced relation to conduit 11 by means of spacer support fins 20. An outwardly-projecting annulus 27 definies a barrel or spherical segment section, generally circumjacent guide body 19, for directing the flowing stream of force-transmitting fluid into the bottom end of cylindrical tube 15. A bell or frusto-conical lip 28 opens outwardly above annulus 27 for directing the flow of surplus fluid out into the coolant system of the reactor.

Central guide 19 performs several functions. It acts, when no control fluid is flowing, to direct the force-transmitting fluid by utilizing the Coanda effect along surface 23 into the space between cylinders 14 and 15. Secondly, it also acts, when control fluid is flowing, to direct the control fluid into the force-transmitting fluid stream, to deflect it into protruding annulus or barrel section 27, which in turn diverts the force-transmitting fluid into the bottom end of cylindrical tube 15. Thirdly, the extended top end of central guide 19 acts not only as a stop to support control rod 17 at the bottom of its travel in cylindrical tube 15, but also to guide the diverted force-transmitting fluid entering cylindrical tube 15.

Specifically, to perform the first of the above functions, guide body 19 is provided with a straight cylindrical surface 23 which is aligned with the outside surfaces of control fluid conduit 11 and inner cylindrical tube 15. The force-transmitting fluid is thus permitted to flow unimpeded in a straight line along the outside surface of conduit 11, surface 23, and the outside surface of cylindrical tube 15 into the space between tubes 14 and 15.

To perform the second of the above functions, central guide 19 is provided with a frusto-conical or beveled surface 21 along its lower portion above fins 20 which is spaced apart from a similar beveled surface 22 at the top end of conduit 11 to define an annular nozzle orifice 29. The angle of bevels 21 and 22 are adjusted to constrain the control fluid flowing in control fluid conduit 11 into a jet directed at an angle against the force-transmitting fluid flowing between conduits 10 and 11. Bevels 21 and 22 need not be straight, i.e., conical, as shown, but may be curved to more effectively constrain and direct the control fluid at an angle against the force-transmitting fluid.

Figure 5:
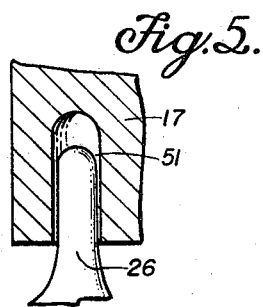
FIGURE 5 is a detail showing a method of dampening the downward travel of the control rod.

To perform the third of the above functions, central guide 19 is provided with a second frusto-conical or beveled surface 24 spaced apart from a similarly beveled surface 25 at the bottom end of cylindrical tube 15. The two surfaces 24 and 25 are established at an appropriate angle to define an annular orifice adapted to receive ahe force-transmitting fluid when it is diverted, i.e, switched (see FIGURE 2) to flow into the bottom end of cylindrical tube 15. Surfaces 24 and 25, as the case with bevels 21 and 22, need not be straight, i.e., conical, but may be curved to more effectively receive and direct the force-transmitting fluid upwardly against piston 16 and control rod 17. Central guide 19, at its top end above bevel 24, is elongated to define a knob or stop 26 which acts to limit the downward travel of control rod 17. With reference to FIGURE 5, the downward travel of rod 17, when it reaches stop 26, may be damped by providing a recess 51 of a relatively larger diameter than stop 26 in the bottom of rod 17, so that the fluid is compressed by stop 26, but is able to flow through the clearance space between stop 26 and recess 51.

As part of fluidic switch unit 12, outwardly projecting annulus 27 defining a barrel or spherical segment section is arranged circumjacent and spaced apart from central guide 19. The curvature of annulus 27 need not be perfectly spherical, but may be any suitable curved section along which the force-transmitting fluid will flow in close proximity when control fluid is flowing out of nozzle 29 and which is also suitably curved to direct the flow of force-transmitting fluid under these conditions into the bottom end of cylindrical tube 15. It must be noted that the force-transmitting fluid flows continuously through fluidic switch unit 12 and is merely diverted, i.e, switched, back and forth between the bottom of cylinder 15 and the space between cylinders 14 and 15 by causing control fluid to flow or not to flow, respectively, in conduit 11. To maintain the flow of force-transmitting fluid into the bottom of cylinder 15, control fluid must flow continuously from conduit 11. Therefore, the space between frusto-conical lip 28 and outer cylindrical tube 14 provides a convenient exit for all the fluids, i.e., force-transmitting and control fluids.

The tops of both outer cylindrical tube 14 and inner cylindrical tube 15 are capped and sealed with a common cover plate 31 to confine the flow of fluid to tubes 14 and 15. Holes 32 are provided in the wall near the top of cylindrical tube 15 to permit the flow of fluid from the space between tubes 14 and 15, and in the upper portion of tube 15 as piston 16 is driven up and down tube 15.

The operation of the control rod drive system of the present invention is accomplished with the help of the Coanda effect, i.e., the tendency of a fluid to adhere to the wall of the container in which it is flowing until it comes to a portion of the container wall which is so sharply curved that the forces due to the momentum of the fluid exceed the forces holding the fluid against the wall.

Referring to FIGURE 1, when no control fluid is flowing in conduit 11 and only force-transmitting fluid, as indicated by arrows 33, is flowing in the space between conduits 10 and 11, the force-transmitting fluid will tend to follow the straight cylindrical surface 23 of central guide 19. A relatively sharp corner 34 is provided at the base of annulus 27 so that the force-transmitting fluid flowing along the inside wall of conduit 10 will break away from that wall and continue in a straight line toward the space between cylindrical tubes 14 and 15.

In a like manner, corner 35 is provided at the point where straight portion 23 meets bevel 24 of central guide 19 to permit the force-transmitting fluid to break away from straight portion 23 and continue in a straight line toward the space between cylindrical tubes 14 and 15.

As the force-transmitting fluid enters the space between tubes 14 and 15, it continues up the space as indicated by arrows 37, through holes 32 as indicated by arrows 38, into inner cylindrical tube 15, subjecting piston 16 to a hydraulic pressure, forcing it down cylinder 15 until it rests against stop 26 on central guide 19, forcing fluid, as indicated by arrows 52, out the bottom end of cylindrical tube 15. When inner cylindrical tube 15 and the space between cylindrical tubes 14 and 15 are filled with fluid, and piston 16 is at its lowest position, a pressure equilibrium condition results and the excess force-transmitting fluid passes out into the reactor primary coolant system as indicated by arrows 45.

For the condition where no control fluid flows in conduit 11, as described above and accordang to FIGURE 1, some fluid will occupy annulus 27, but for this condition, it will circulate in a closed path as indicated by arrows 36.

Referring to FIGURE 2, when control fluid is flowing in conduit 11, as indicated by arrows 40, a jet is formed when control fluid passes through annular nozzle 29 which is directed at an angle against the flow of force-transmitting fluid indicated by arrows 33. The direction and force of the control fluid jet is adjusted to divert the flow of force-transmitting fluid around corner 34 at the base of outwardly projecting annulus 27 and along the inside surface of annulus 27. As it flows along the inside surface of annulus 27, the direction of the force-transmitting fluid is changed to direct it into the bottom of cylindrical tube 15 between bevels 24 and 25. Corner 42, where the upper end of annulus 27 meets the lower end of frusto-conical lip 28 is made sharp enough so that the Coanda effect is overcome by the momentum forces of the force-transmitting fluid, thus permitting the force-transmitting fluid to continue in a straight line into the bottom end of cylindrical tube 15. The flow rate of the force-transmitting fluid is adjusted to provide sufficient hydraulic pressure upon impact into the bottom of tube 15 to cause rod 17 and piston 16 to rise up in cylinder 15. The fluid above piston 16 which is displaced as piston 16 rises in tube 15, passes through holes 32, as indicated by arrows 43, down the space between tubes 14 and 15, as indicated by arrows 44, and out into the reactor coolant system between the bottom of outer cylindrical tube 14 and frusto-conical lip 28, as indicated by arrows 45.

After piston 16 reaches the top of inner cylindrical tube 15, a pressure equilibrium condition will exist, similar to the case of FIGURE 1, in which event, the excess force-transmitting fluid and control fluid will exit, as indicated by arrows 46, between the bottom end of outer cylindrical tube 14 and frusto-conical lip 28 into the reactor coolant system.

In addition, it must be noted that for the conditions illustrated in FIGURE 2 where control fluid is used to divert the force-transmitting fluid, the space adjacent to surface 23 of central guide 19 will be occupied by fluid which will circulate in a closed path as indicated by arrows 47 in a manner similar to the flow of fluid indicated by arrows 36 in FIGURE 1.

Thus, by causing a small volume of control fluid to flow in conduit 11 and out through annular nozzle 29, the larger volume of force-transmitting fluid flowing in the space between conduits 10 and 11 can be switched to cause piston 16 to rise or fall in inner cylindrical tube 15 and thus cause control rod 17 to be inserted into or be withdrawn from core 50 (FIGURES 3 and 4) to control the neutron flux therein by neutron-absorbing techniques well known in the art.

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended claims.

I claim:
1. In a nuclear reactor having a core of fissile fuel and means for forcing coolant flow through channels in said core, the combination comprising an elongated tube arranged in each channel in said core, said tube being provided with at least one fluid opening in each end portion thereof, a freely slidable piston in said tube, a rod of reactivity-influencing material connected to said piston, a second tube, open at one end, concentric with and spaced apart around said elongated tube and communicating adjacent a closed end thereof with said other end of said elongated tube, and fluidic switching means communicating with each end of said elongated tube for fluidically switching the flow of said force-transmitting fluid from one end of said elongated tube to the other end of said elongated tube, so as to reposition said reactivity-influencing material with respect to said core.

2. Apparatus as defined in claim 1, wherein said fluidically switching means comprises a control fluid conduit, a force-transmitting fluid conduit coaxial with and spaced apart from said control fluid conduit, and means proximate the end of said control fluid conduit and said force-transmitting fluid conduit for diverting said force-transmitting fluid by interaction with said control fluid into said one end of said elongated tube.

3. Apparatus as defined in claim 2, wherein said means for deflecting said force-transmitting fluid comprises a central guide coaxially aligned with said control fluid conduit and spaced apart from the end thereof to define an annular nozzle and an outwardly curved annulus section concentric with said central guide attached to the end of said force-transmitting fluid conduit, with said elongated tube coaxial with said central guide and said outwardly curved annulus section, and with one end of said tube arranged to receive said force-transmitting fluid deflected by said outwardly curved annulus section.

4. Apparatus as defined in claim 3, wherein said central guide has an upper end, said upper end defining a means for stopping the downward travel of said piston.

5. The apparatus as defined in claim 1, wherein said rod of reactivity-influencing material is a poison control rod.

6. The apparatus as defined in claim 1, wherein said rod of reactivity-influencing material is a reactivity material enhancing rod.

References Cited

UNITED STATES PATENTS

| | | | |
|---|---|---|---|
| 2,952,600 | 9/1960 | Newson | 176—86 |
| 2,975,119 | 3/1961 | Emmons | 176—36 |
| 3,122,045 | 2/1964 | Zilberfarb | 137—81.5 |
| 3,223,103 | 12/1965 | Trinkler | 137—81.5 |
| 3,233,522 | 2/1966 | Stern | 137—81.5 |
| 3,297,537 | 1/1967 | Natland | 176—36 |
| 3,400,047 | 9/1988 | Howard | 176—61 |

OTHER REFERENCES

Fluid Power Institute, "Proceedings of the Second Fluidics Seminar on Ind. Applications on Fluid Amplifiers," 1966, pp. 3–14.

CARL D. QUARFORTH, Primary Examiner

H. E. BEHREND, Assistant Examiner

U.S. Cl. X.R.

137—81.5